3,446,864
POLYALKYL BIPHENYLS AND PROCESS OF PREPARING SAME
Imre Puskas and Ellis K. Fields, Chicago, Ill., assignors to Standard Oil Company, Chicago, Ill., a corporation of Indiana
No Drawing. Filed Mar. 28, 1967, Ser. No. 626,717
Int. Cl. C07c *15/08, 15/20*
U.S. Cl. 260—668
17 Claims

ABSTRACT OF THE DISCLOSURE

The invention describes a process for preparing novel unsymmetrical polyalkylbiphenyls wherein mixtures of two properly selected alkyl homologs of benzene are treated with nitric acid at temperatures of about —20 to —50° C. The polyalkylbiphenyls are useful as antiknock materials, vapor phase heat transfer agents and intermediates in the synthesis of biphenyl polycarboxylic acids.

According to the process of this invention novel unsymmetrical polyalkylbiphenyls are produced by an oxidative coupling reaction when nitric acid is added to the mixture of two selected benzene homologs. The highest yields of polyalkylbiphenyls are obtained with methyl homologs of benzene. In order to obtain reasonable yields of coupling one of the two alkylbenzenes used in the reaction must be an ortho dialkyl or ortho trialkylbenzene, preferably ortho xylene or hemimellitene. The reaction in a general form is illustrated below:

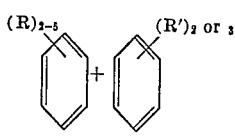

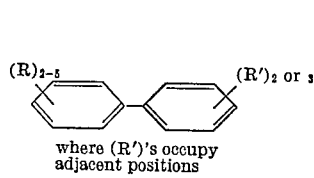

According to this process new compositions of matter are obtained which cannot generally be obtained by any other synthetic routes. The new polyalkylbiphenyls have the following generic formula:

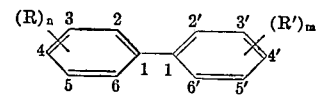

wherein Rs and R's are preferably methyl groups but can be any alkyl group; wherein $n$ is an integer from 2 through 5 inclusive and $m$ is an integer from 2 to 3 inclusive; and wherein the R's occupy adjacent positions.

In Table I are given the physical constants of the isolated new compositions of matter prepared by this novel coupling process. Their structures have been identified on the basis of elemental analyses, molecular weights (mass spectra), nuclear magnetic resonance, ultraviolet and infrared spectra.

TABLE I.—PHYSICAL CONSTANTS AND ELEMENTAL ANALYSES OF THE NEW POLYMETHYLBIPHENYLS

| Compound | Melting point, °C. | Empirical formula | | Elemental analyses | |
|---|---|---|---|---|---|
| | | | | Carbon | Hydrogen |
| 3,2,3',4,4',5'-hexamethylbiphenyl | [1] 63–65 | $C_{18}H_{22}$ | Calc. | 90.70 | 9.30 |
| | | | Found | 90.63 | 9.19 |
| 2,3',4,4'-tetramethylbiphenyl | [2] Liqiud | $C_{16}H_{18}$ | Calc. | 91.37 | 8.63 |
| | | | Found | 89.57 | 8.58 |
| 2,3,3',4,4'-pentamethylbiphenyl | 50 | $C_{17}H_{20}$ | Calc. | 91.02 | 8.98 |
| | | | Found | 91.57 | 8.62 |
| 2,3',4,4',5-pentamethylbiphenyl | [2] Liquid | $C_{17}H_{20}$ | Calc. | 91.02 | 8.98 |
| | | | Found | 90.75 | 9.14 |
| 2,3',4,4',6-pentamethylbiphenyl | 49 | $C_{17}H_{20}$ | Calc. | 91.02 | 8.98 |
| | | | Found | 90.97 | 8.93 |
| 2,3,3',4,4',5-hexamethylbiphenyl | 56 | $C_{18}H_{22}$ | Calc. | 90.70 | 9.30 |
| | | | Found | 90.49 | 9.26 |
| 2,3,3',4,4',6-hexamethylbiphenyl | 57 | $C_{18}H_{22}$ | Calc. | 90.70 | 9.30 |
| | | | Found | 90.46 | 9.18 |

[1] This compound was 92% pure according to gas chromatography.
[2] Gas chromatography revealed the presence of trace impurities which might have prevented crystallization.

According to the preferred mode of operation into a 3-necked flask equipped with a mechanical stirrer, a thermometer and a dropping funnel is placed the useful hydrocarbon pair such as o-xylene-mesitylene, o-xylene-m-xylene, o-xylene-hemimellitene, o-xylene-pseudocumene, o-xylene-prehnitene, o-xylene-isodurene, and hemimellitene-mesitylene. The mole ratio of the two hydrocarbons can vary from 0.5 to 2.0, the preferred ratio being 1 to 1 mole. In case of hemimellitene coupling can be obtained with itself, without the use of a second hydrocarbon. The hydrocarbon mixture is cooled to the lower limit of the temperature range determined for the hydrocarbon pair and disclosed in Table II by means of a thermostatted bath. With stirring the nitric acid is introduced dropwise, slowly to control the exothermic reaction within the temperature ranges specified in Table II. The nitric acid concentration may vary between 80–100%; approximately 90% is the preferred acid concentration. The acid is used in excess, approximately three moles of acid being used for each mole of the hydrocarbon. Addition of the acid has different time requirement depending on the scale of the experiment and the efficiency of the cooling. After being stirred an additional 20–60 minutes the reaction is rapidly quenched by pouring the contents of the flask on a stirred mixture of ethanol-free ether and ice. After extraction, the ether layer is washed with a 10% sodium hydroxide solution and water, and dried with saturated sodium chloride solution. Removal of the ether in a Rotavapor gives the crude reaction mixtures which is vacuum fractionated through a Vigreux column. The polymethylbiphenyls distill in the 102–134° C. range at 0.1 Torr. They can be crystallized in most cases from methanol containing a little ethyl acetate.

flask equipped with a mechanical stirrer, a thermometer and a dropping funnel. The flask containing 0.1 mole of o-xylene and 0.1 mole of m-xylene was immersed in a −65° C. bath and cooled to −49° C. Then 28.2 ml. of 90% nitric acid (about 0.6 mole) was added dropwise while the reaction temperature was maintained at −45 ±4° C. After all the acid was added the mixture was stirred an additional 30 minutes at −45±2° C. and poured rapidly on a stirred mixture of ethanol-free ether and ice to quench the reaction. The products were extracted into the ether layer and were washed with a 10% solution of sodium hydroxide and with water and dried with TABLE II.—YIELD AND CONVERSION OF THE OXIDATIVE COUPLING REACTION OF METHYLBENZENES UNDER THE INFLUENCE OF NITRIC ACID

| Hydrocarbon Component | | Temp., °C. | Conversion,[1] percent | Yield of polymethylbiphenyls | |
|---|---|---|---|---|---|
| 1 | 2 | | | Major isomer, percent | Total, percent |
| o-Xylene | m-Xylene | −45±4 | 33.5 | 13 | 13 |
| Do | Hemimellitene | −44±3 | 33.6 | 17 | 21 |
| Do | Pseudocumene | −46±2 | 28.3 | 22 | 23 |
| Do | Mesitylene | −40±2 | 41.5 | 29 | 30 |
| Do | Prehnitene | −22±2 | 51.4 | 27 | 27 |
| Do | Isodurene | −38±2 | 40.0 | 25 | 25 |
| Hemimellitene | Mesitylene | −37±2 | 35.5 | 3 | 3 |
| Do | Hemimellitene | −26±3 | 41 | 10 | 15 |

[1] Calculated for the averaged consumed hydrocarbon.

The following examples illustrate some embodiments of this invention. It will be understood that these are for illustrative purposes only and do not purport to be wholly definitive with respect to conditions and scope.

EXAMPLE I

The reaction vessel was a round-bottomed 3-necked flask equipped with a mechanical stirrer, a thermometer and a dropping funnel. The flask containing 0.2 mole of hemimellitene was immersed in a bath of about −45° C. and the contents were cooled to −23° C. Then 28.2 ml. of 90% nitric acid (about 0.6 mole) was added dropwise, while the reaction temperature was maintained at −26 ±3° C. After all the acid was added the mixture was stirred an additional 30 minutes at −26±3° C. and poured rapidly on a stirred mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography. (Table III). According to this process 2,3,3′,4,4′,5′-hexamethylbiphenyl was produced. This compound was isolated by fractionation of the reaction mixture, boiling at 143–147° C. at 0.25 Torr. Repeated recrystallization from methanol and hexane gave the compound in 92% purity.

TABLE III

Product distribution from the reaction of nitric acid with hemimellitene at −26±3° C.

| | Percent |
|---|---|
| Hemimellitene | 56.0 |
| 4-nitrohemimellitene | 14.5 |
| 5-nitrohemimellitene | 5.6 |
| Unidentified (shoulder on the previous peak) | 0.6 |
| 4,6-dinitrohemimellitene | 0.9 |
| 4,5-dinitrohemimellitene | 0.6 |
| Unidentified | 0.2 |
| 2,3,3′,4,4′,5′-hexamethylbiphenyl | 3.8 |
| Unidentified (3 peaks) | 0.7 |
| 2-nitro-2′,3,3′,4,4′,5′-hexamethylbiphenyl | 1.3 |
| 2-nitro-3,3′,4,4′,5,5′-hexamethylbiphenyl | 2.7 |

EXAMPLE II

The reaction vessel was a round-bottomed 3-necked saturated sodium chloride solution. The ether was removed in a Rotavapor at room temperature. The residues were analyzed by gas chromatography (Table IV). According to this process 2,3′,4,4′-tetramethylbiphenyl was produced. This compound was isolated in 94% purity by fractionation of the reaction mixture boiling at 102–103° C. at 0.1 Torr.

TABLE IV

Product distribution from the reaction of nitric acid with mixture of o-xylene and m-xylene at −45±4° C.

| | Percent |
|---|---|
| m-Xylene | 34.6 |
| o-Xylene | 33.7 |
| 2-nitro-m-xylene | 1.2 |
| 4-nitro-m-xylene + 3-nitro-o-xylene | 9.2 |
| 4-nitro-o-xylene | 5.2 |
| Three unidentified components, traces 2,3′,4,4′-tetramethylbiphenyl | 4.9 |
| Unidentified | 0.1 |
| Nitrotetramethylbiphenyl isomers (4 peaks) | 0.9 |

EXAMPLE III

The reaction vessel was a round-bottomed 3-necked flask equipped with a mechanical stirrer, a thermometer and a dropping funnel. The flask containing 0.1 mole of o-xylene and 0.1 mole of hemimellitene was immersed in −65° C. bath. Then 28.2 ml. of 90% nitric acid (about 0.6 mole) was added dropwise, while the reaction temperature was maintained at −45±3° C. After all the acid was added the mixture was stirred an additional 30 minutes at −45±3° C. and poured rapidly on a mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography (Table IV). According to this process 2,3,3′,4,4′-pentamethylbiphenyl was produced. This compound was isolated by fractionation of the reaction mixture, boiling at 118–126° C. at 0.1 Torr. Small amounts of impurities were difficult to remove; repeated crystallization from methanol gave the compound in 99.3% purity.

TABLE V

Product distribution from the reaction of nitric acid with a mixture of o-xylene and hemimellitene at −44±3° C.

| | Percent |
|---|---|
| o-Xylene | 31.4 |
| Hemimellitene | 35.6 |
| 3-nitro-o-xylene | 1.7 |
| 4-nitro-o-xylene | 6.2 |
| 4-nitrohemimellitene | 4.3 |
| 5-nitrohemimellitene | 1.7 |
| Two unidentified components | 0.3 |
| 2,3,3',4,4'-pentamethylbiphenyl | 5.8 |
| Hexamethylbiphenyl (M.W. 238) | 1.4 |
| Nitrotetramethylbiphenyls, nitropentamethylbiphenyls and nitrohexamethylbiphenyls (5 peaks) | 2.0 |

EXAMPLE IV

The reaction vessel was a round-bottomed 3-necked flask equipped with a mechanical stirrer, a thermometer and a dropping funnel. The flask containing 0.1 mole of o-xylene and 0.1 mole of pseudocumene was immersed in a −65° C. bath. Then 28.2 ml. of 90% nitric acid (about 0.6 mole) was added dropwise, while the reaction temperature was maintained at −46±2° C. After all the acid was added the mixture was stirred an additional 35 minutes at −45° and poured rapidly on a stirred mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography (Table VI). According to this process 2,3',4,4',5-pentamethylbiphenyl was produced. This compound was isolated in 77% purity by fractionation of the reaction mixture boiling at 113–123° C. at 0.1 Torr.

TABLE VI

Product distribution from the reaction of nitric acid with mixture of o-xylene and pseudocumene at −44±2° C.

| | Percent |
|---|---|
| o-Xylene | 31.8 |
| Pseudocumene | 35.2 |
| 3-nitro-o-xylene | 1.8 |
| 3-nitropseudocumene | 0.5 |
| 4-nitro-o-xylene | 8.2 |
| 6-nitropseudocumene | 1.8 |
| 5-nitropseudocumene | 4.3 |
| Five unidentified components | 0.5 |
| Dinitropseudocumenes (2 peaks) [1] | 0.8 |
| 2,3',4,4',5-pentamethylbiphenyl | 7.9 |
| Hexamethylbiphenyl (M.W. 238) | 0.2 |
| Nitrotetramethylbiphenyls, nitropentamethylbiphenyls (3 peaks) | 2.0 |

[1] These components were practically absent in large scale experiments.

EXAMPLE V

The reaction vessel was a round-bottomed 3-necked flask equipped with a mechanical stirrer, a thermometer and a dropping funnel. The flask containing 0.1 mole of o-xylene and 0.1 mole of mesitylene was immersed in a −60° C. bath. Then 28.2 ml. of 90% nitric acid (about 0.6 mole) was added dropwise while the reaction temperature was maintained at −40±2° C. After all the acid was added the mixture was stirred an additional 35 minutes at −40° C. and poured rapidly on a stirred mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography (Table VII). According to this process 2,3',- 4,4',6-pentamethylbiphenyl was produced: This compound was isolated by fractionation of the reaction mixture boiling at 120–122° C. at 0.3 Torr. Recrystallization from methanol gave the compound in analytical purity.

TABLE VII

Product distribution from the reaction of nitric acid with mixture of o-xylene and mesitylene at −40±2° C.

| | Percent |
|---|---|
| o-Xylene | 23.9 |
| Mesitylene | 30.0 |
| 3-nitro-o-xylene + nitromesitylene | 13.3 |
| 4-nitro-o-xylene | 12.3 |
| 2,3',4,4',6-pentamethylbiphenyl | 11.5 |
| Unidentified (2 peaks), traces | |
| 3-nitro-2,3',4,4',6-pentamethylbiphenyl | 0.5 |
| 2-nitro-3',4,4',5-tetramethylbiphenyl | 0.5 |

EXAMPLE VI

The reaction vessel was a round-bottomed 3-necked flask equipped with a mechanical stirrer, a thermometer and a dropping funnel. The flask containing 0.1 mole of o-xylene and 0.1 mole of prehnitene was immersed in a −33° C. bath. Then 28.2 ml. of 90% nitric acid (about 0.6 mole) was added dropwise, while the reaction temperature was maintained at −21±2° C. After all the acid was added the mixture was stirred an additional 30 minutes at −22° C. and poured rapidly on a mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography (Table VIII). According to this process 2,3,3',- 4,4',5-hexamethylbiphenyl was produced. This compound was isolated by fractionation of the reaction mixture, boiling at 132–134° C. at 0.1 Torr. One gram of pure product was obtained after recrystallization from methanol containing very little ethyl acetate.

TABLE VIII

Product distribution from the reaction of nitric acid with mixture of o-xylene and prehnitene at −21±2° C.

| | Percent |
|---|---|
| o-Xylene | 20.8 |
| Prehnitene | 24.9 |
| 3-nitro-o-xylene | 3.5 |
| 4-nitro-o-xylene | 13.4 |
| Nitroprehnitene | 12.5 |
| Unidentified | 0.3 |
| Unidentified (dinitroprehnitene?) | 0.3 |
| 2,3,3',4,4',5-hexamethylbiphenyl | 12.8 |
| Nitrotetramethylbiphenyls, nitrohexamethylbiphenyl, heptamethyldiphenylmethanes, octamethyldiphenylmethanes (6 peaks) | 2.7 |

EXAMPLE VII

The reaction vessel was a round-bottomed 3-necked flask equipped with a mechanical stirrer, a thermometer and a dropping funnel. The flask containing 0.5 mole of o-xylene and 0.5 mole of isodurene was immersed in a −52° C. bath. Then 28.2 ml. of 90% nitric acid (about 0.6 mole) was added dropwise while the reaction temperature was maintained at −38±2° C. After all the acid was added the mixture was stirred an additional 60 minutes at −38° C. and poured rapidly on a stirred mixture of ethanol-free ether and ice to quench the reaction. The products were extracted into the ether layer and were washed with a 10% solution of sodium hydroxide and with water and dried with saturated sodium chloride solution. The ether was removed in a Rotavapor at room temperature. The residues were analyzed by gas chromatography. (Table IX) According to this process 2,3,3',4,4',6- hexamethylbiphenyl was produced. The compound was isolated by fractionation of the reaction mixture and recrystallization from methanol-ethyl acetate (5:1) of the cut boiling at 128–138° C., 0.1 Torr. 9.5 grams of pure product was obtained.

TABLE IX

Product distribution from the reaction of nitric acid with mixture of o-xylene and isodurene at −38±2° C.

| | Percent |
|---|---|
| o-Xylene | 23.6 |
| Isodurene | 32.8 |
| 3-nitro-o-xylene | 2.6 |
| 4-nitro-o-xylene | 11.1 |
| Nitroisodurene | 5.3 |
| 2,3,3′,4,4′,6-hexamethylbiphenyl | 9.3 |
| Pentamethyldiphenylmethane (M.W. 238) | 0.8 |
| Nitrotetramethylbiphenyls + heptamethyldiphenylmethanes (3 peaks) | 3.3 |

What is claimed is:

1. As a composition of matter polymethylbiphenyls of the formula

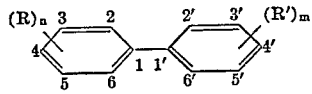

wherein $n$ is an integer from 2 through 5 inclusive and $m$ is an integer from 2 to 3 inclusive wherein the R and R′ are methyl groups and wherein the (R′)'s are adjacent to each other on the benzene ring.

2. As a composition of matter the compound of claim 1 wherein $n$ is 3 and $m$ is 3 and wherein R and R′ are attached to the biphenyl at the 2,3,3′,4,4′,5′ positions.

3. As a composition of matter the compound of claim 1 wherein $n$ is 2 and $m$ is 2 and wherein R and R′ are attached to the biphenyl at the 2,3′,4,4′ positions.

4. As a composition of matter the compound of claim 1 wherein $n$ is 3 and $m$ is 2 and wherein R and R′ are attached to the biphenyl at the 2,3,3′,4,4′,5 positions.

5. As a composition of matter the compound of claim 1 wherein the $n$ is 3 and $m$ is 2 and wherein R and R′ are attached to the biphenyl at the 2,3′,4,4′,5 positions.

6. As a composition of matter the compound of claim 1 wherein $n$ is 3 and $m$ is 2 and wherein R and R′ are attached to the biphenyl at the 2,3′,4,4′,6 positions.

7. As a composition of matter the compound of claim 1 wherein $n$ is 4 and $m$ is 2 and wherein R and R′ are attached to the biphenyl at the 2,3,3′,4,4′,5 positions.

8. As a composition of matter the compound of claim 1 wherein $n$ is 4 and $m$ is 2 and wherein R and R′ are attached to the biphenyl at the 2,3,3′,4,4′,6 positions.

9. A process for preparing unsymmetrical polymethylbiphenyls of the formula given in claim 1 by adding nitric acid in a temperature range of −20 to −50° C. to a 0.5:2 to 1:1 molar mixture of two polymethylbenzenes one component of which is a dimethylbenzene or trimethylbenzene having adjacent methyl groups.

10. A process of claim 9 wherein the molar ratio of the two polymethylbiphenyls is 1:1.

11. The process of claim 10 wherein a single hydrocarbon, hemimellitene, is treated with nitric acid to produce 2,3,3′,4,4′,5′ hexamethylbiphenyl.

12. The process of claim 10 wherein the methylbenzenes are o-xylene and m-xylene.

13. The process of claim 10 wherein the methylbenzenes are o-xylene and hemimellitene.

14. The process of claim 10 wherein the methylbenzenes are o-xylene and pseudocumene.

15. The process of claim 10 wherein the methylbenzenes are o-xylene and mesitylene.

16. The process of claim 10 wherein the methylbenzenes are o-xylene and prehnitene.

17. The process of claim 10 wherein the methylbenzenes are o-xylene and isodurene.

No references cited.

DELBERT E. GANTZ, Primary Examiner.

C. R. DAVIS, Assistant Examiner.

U.S. Cl. X.R.

260—670